(12) United States Patent
Smedberg et al.

(10) Patent No.: US 8,247,696 B2
(45) Date of Patent: Aug. 21, 2012

(54) CROSS-LINKING AGENT

(75) Inventors: Annika Smedberg, Myggenäs (SE); Bill Gustafsson, Stenungsund (SE)

(73) Assignee: Borealis Technology Oy, Porvoo (FI)

( * ) Notice: Subject to any disclaimer, the term of this patent is extended or adjusted under 35 U.S.C. 154(b) by 519 days.

(21) Appl. No.: 12/522,503

(22) PCT Filed: Dec. 19, 2007

(86) PCT No.: PCT/EP2007/011210
§ 371 (c)(1),
(2), (4) Date: Jul. 8, 2009

(87) PCT Pub. No.: WO2008/083822
PCT Pub. Date: Jul. 17, 2008

(65) Prior Publication Data
US 2010/0108357 A1    May 6, 2010

(30) Foreign Application Priority Data
Jan. 9, 2007 (EP) ..................... 07000377

(51) Int. Cl.
*H01B 7/00* (2006.01)
(52) U.S. Cl. ............... 174/120 R; 174/120 SC
(58) Field of Classification Search ............ 174/36, 174/110 R, 120 R, 120 AR, 121 R, 121 SR
See application file for complete search history.

(56) References Cited

U.S. PATENT DOCUMENTS

| 4,027,080 A | * | 5/1977 | Amtmann et al. ............. 525/55 |
| 4,565,763 A | * | 1/1986 | Uchiyama et al. .......... 430/109.3 |
| 4,694,040 A | * | 9/1987 | Hashimoto et al. ........... 524/765 |
| 5,118,763 A | | 6/1992 | Aoki et al. |
| 5,480,942 A | | 1/1996 | Addeo et al. |
| 6,063,898 A | * | 5/2000 | Endo et al. .................... 528/411 |
| 6,967,229 B2 | * | 11/2005 | Voorheis ....................... 525/264 |
| 7,468,408 B2 | * | 12/2008 | Onishi et al. .................... 524/88 |
| 2006/0029811 A1 | * | 2/2006 | Sugioka et al. ............... 428/413 |

FOREIGN PATENT DOCUMENTS

| EP | 0430092 A | * | 5/1991 |
| EP | 0 430 092 | | 6/1991 |
| EP | 1 695 992 | | 8/2006 |
| EP | 1 695 996 | | 8/2006 |
| JP | 6 275 129 | | 9/1994 |
| WO | 93/08222 | | 4/1993 |
| WO | 96/35732 | | 11/1996 |
| WO | 97/45465 | | 12/1997 |

* cited by examiner

*Primary Examiner* — William Mayo, III
(74) *Attorney, Agent, or Firm* — Roberts Mlotkowski Safran & Cole, P.C.

(57) ABSTRACT

A crosslinkable polymer composition of an unsaturated polyolefin having a total amount of carbon-carbon double bonds/1000 carbon atoms of at least 0.38, and at least one crosslinking agent being a carbon-carbon initiator that is free of peroxide groups and capable of thermally decomposing into carbon-based free radicals by breaking at least one carbon-carbon single bond, such as 3,4-dimethyl-3,4-diphenylhexane.

36 Claims, No Drawings

CROSS-LINKING AGENT

TECHNICAL FIELD

The present invention relates to a crosslinkable polymer composition comprising an unsaturated polyolefin and a specific type of crosslinking agent.

TECHNICAL BACKGROUND

Electric cables and wires are generally composed of one or several polymer layers extruded around an electric conductor(s). The electric conductor is usually coated first with an inner semiconducting layer followed by an insulating layer, and then an outer semiconducting layer. To these layers further layers may be added, such as a water barrier layer and a surrounding sheath layer (jacketing layer) applied on the outside of the said layers.

The insulating layer and the semiconducting layers normally consist of a polymer composition comprising a crosslinked polyolefin. Crosslinking substantially contributes to improve such properties of the polymer as its heat and creep resistance, mechanical strength, chemical resistance, and abrasion resistance.

Common polymeric materials for wire and cable applications comprises ethylene homo- and/or copolymers and propylene homo- and/or copolymers, including ethylene-propylene-elastomers. Normally, the insulating layer and the semiconducting layer comprises crosslinked ethylene homo- and/or copolymers, herein referred to as ethylene (co)polymers. LDPE (low density polyethylene), i.e. polyethylene prepared by radical polymerisation at high pressure, crosslinked by adding peroxide, for instance dicumyl peroxide, is today the predominant cable insulating material for power cables.

Cross-linked polyolefins, such as crosslinked ethylene homo- and/or copolymers and propylene homo- and/or copolymers, are also extensively used for pipes, such as water pipes, gas pipes, sewage pipes, coated steel pipes and aluminum multilayer pipes.

Crosslinking can be brought about by adding free-radical-forming agents (also called crosslinking or curing agents), such as peroxides, to the polymer composition prior to or during extrusion of the cable or pipe and the crosslinking is initiated by heating in a subsequent vulcanization step, such that the peroxide is decomposed to form free radicals. These free radicals introduce the crosslinks in the material and thus build up the network structure.

In general, the degree of unsaturation of polyolefins is dependent on specific conditions chosen for the polymerisation process. This is true for high pressure as well as low pressure conditions. Normally, polyethylene produced by radical polymerisation, so-called low-density polyethylene, LDPE, has a low degree of unsaturation in the order of 0.1 vinyl groups (generally up to about 0.37 double bonds) per 1000 carbon atoms. However, in many situations, it is desirable to use polymers having a higher degree of unsaturation, which may serve as seat for chemical reactions, such as the introduction of functional groups into the polymer molecule or the cross-linking of the polymer.

In WO 9308222 it is described how the unsaturation of an ethylene copolymer can be increased by high pressure radical polymerisation of ethylene and a specific type of polyunsaturated monomer, such as an $\alpha,\omega$-alkadiene. One double bond of this polyunsaturated compound is polymerised into the polymer chain while the other double bond or bonds do not react and instead increase the unsaturation of the polymer. The non-reacted double bond(s) will be positioned at the end of short branches, thus providing so-called pendant vinyl groups, at the site in the polymer chain where the polyunsaturated compound was incorporated by polymerisation, such that the unsaturation is uniformly distributed along the polymer chain in essentially random copolymerisation. The increased amount of unsaturation of the LDPE copolymer increases the crosslinking response when combined with a crosslinking agent.

In WO 9635732 it is described how the unsaturation of an ethylene copolymer can be increased by high pressure radical polymerisation of ethylene and a certain type of polyunsaturated $\alpha,\omega$-divinylsiloxanes. The prepared ethylene copolymers have enhanced water tree resistance and an increased degree of unsaturation.

In WO 9745465 it is described how the unsaturation of an ethylene copolymer can be increased by high pressure radical polymerisation of ethylene and a certain type of polyunsaturated $\alpha,\omega$-divinylether.

As apparent for persons skilled in the art, the above mentioned ethylene copolymers can be cross-linked by subjecting the copolymer to an elevated temperature in the presence of a cross-linking agent.

Generally, these types of ethylene copolymers start to crosslink at about 160° C. depending on the type of crosslinking agent used. The temperature of the vulcanization tube is usually up to about 400° C.

A crosslinking agent is usually defined to be any compound capable to generate radicals which can initiate a crosslinking reaction. Normally, the crosslinking agent contains at least one —O—O— bond or at least one —N=N— bond. Peroxides, such as dicumylperoxide, are often used as crosslinking agents.

During the crosslinking step, by-products are generated due to decomposition of the crosslinking agent.

For instance, dicumylperoxide typically generates methane, acetophenone and cumyl alcohol upon decomposition.

Most by-products are captured within the cable and the volatile fraction thereof has to be removed in a subsequent so-called degassing step. The more by-products generated, the longer the degassing time and/or the higher the degassing temperature. However, mild degassing conditions would be preferred. Milder degassing conditions would also reduce the risk of damaging the cable core layers during the degassing step.

As used herein, volatile by-products comprise any low-molecular compounds which are captured within the polymer composition after the crosslinking step and are removable by thermal treatment at a temperature low enough to avoid significant degradation of the polymeric material.

Moreover, the by-products captured within the cable are usually of polar nature which means that they will have a negative impact on the electrical properties of the cable.

Thus, as evident from above, it would be a great advantage if the generation of these by-products could be reduced or avoided.

U.S. Pat. No. 4,027,080 describes a method for crosslinking of a polyolefin, such as an unmodified high density polyethylene, in the presence of a crosslinking agent without peroxide groups and which give free radicals by splitting along the carbon-carbon bonds, such as 3,4-dimethyl-3,4-diphenylhexane.

U.S. Pat. No. 6,967,229, U.S. Pat. No. 5,118,763, and EP 0430092 describe the use of so-called carbon-carbon initiators for crosslinking of polybutadiene and/or other elastomeric polymers, such as EPDM.

Mention can also be made of JP 06-275129 which discloses a composition comprising a thermoplastic resin, such as polyethylene, 3,4-dimethyl-3,4-diphenylhexane and a multi-functional compound, such as triallylcyanurate.

SUMMARY OF THE INVENTION

An object of the present invention is to alleviate the above problems and to provide an improved crosslinkable polymer composition. More specifically, an object is to provide a crosslinkable polymer composition that upon crosslinking thereof provides a desired degree of crosslinking and a reduced generation of volatile and/or polar by-products during the cross-linking process.

This means that degassing after crosslinking can either be avoided completely or that milder degassing conditions (i.e. reduced degassing time and/or lower degassing temperature) can be used for crosslinked articles produced using said crosslinkable composition according to the invention.

According to a first aspect of the invention, this object is achieved with a crosslinkable polymer composition comprising (i) an unsaturated polyolefin having a total amount of carbon-carbon double bonds/1000 carbon atoms of at least 0.38, and (ii) at least one crosslinking agent being a carbon-carbon initiator that is free of peroxide groups and capable of thermally decomposing into carbon-based free radicals by breaking at least one carbon-carbon single bond.

In particular, said crosslinking agent is a compound according to Formula I

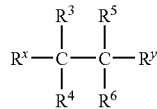

wherein each of $R^3$, $R^4$, $R^5$ and $R^6$ independently is selected from the group consisting of hydrogen, substituted and unsubstituted straight, branched, and cyclic, including aromatic, hydrocarbons, and each of $R^x$ and $R^y$ independently is selected from the group consisting of substituted and unsubstituted aromatic hydrocarbons.

More particularly, said crosslinking agent is a compound according to Formula II:

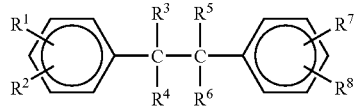

wherein each of $R^1$, $R^2$, $R^7$, $R^8$ independently are selected from group consisting of a hydrogen atom, an $C_{1-6}$ alkyl group, an $C_{1-2}$ alkoxy group, a nitrile group or a halogen atom, and wherein each of $R^3$, $R^4$, $R^5$, $R^6$ independently are selected from group consisting of hydrogen and $C_{1-6}$ alkyl groups.

Examples of suitable compounds are 2,3-dimethyl-2,3-diphenylbutane and 3,4-dimethyl-3,4-diphenylhexane.

A second aspect of the invention relates to a process for the preparation of a crosslinked polymer composition using said crosslinkable polymer composition.

A third aspect of the invention relates to a multilayered article, such as a power cable, having at least one layer, such as a semiconducting layer, an insulating layer, a jacketing layer, comprising said crosslinkable polymer composition.

A fourth aspect of the invention relates to a process for the production of a multilayered article using said crosslinkable polymer composition.

Other features and advantages of the present invention will become apparent from the following description of the invention.

DETAILED DESCRIPTION OF THE INVENTION

The invention relates to a crosslinkable polymer composition comprising (i) an unsaturated polyolefin having a total amount of carbon-carbon double bonds/1000 carbon atoms of at least 0.38, and (ii) at least one crosslinking agent being a carbon-carbon initiator that is free of peroxide groups and capable of thermally decomposing into carbon-based free radicals by breaking at least one carbon-carbon single bond.

In particular, said crosslinking agent is a compound according to Formula I

wherein each of $R^3$, $R^4$, $R^5$ and $R^6$ independently is selected from the group consisting of hydrogen, substituted and unsubstituted straight, branched, and cyclic, including aromatic, hydrocarbons, and each of $R^x$ and $R^y$ independently is selected from the group consisting of substituted and unsubstituted aromatic hydrocarbons.

Advantageously, each of $R^x$ and $R^y$ is independently selected from the group consisting of aryl groups, more advantageously phenyl groups (i.e. an unsubstituted aryl group).

Advantageously, each of $R^3$, $R^4$, $R^5$ and $R^6$ is independently selected from the group consisting of alkyl groups, more advantageously $C_{1-6}$ alkyl groups, in particular $C_{1-3}$ alkyl groups, such as methyl and ethyl.

More particularly, said crosslinking agent in the composition according to the invention is a compound according to Formula II:

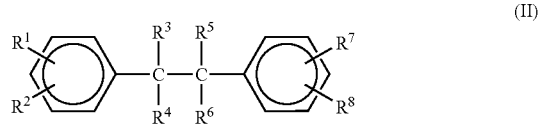

wherein each of $R^1$, $R^2$, $R^7$, $R^8$ independently are selected from group consisting of a hydrogen atom, an $C_{1-6}$ alkyl group, an $C_{1-2}$ alkoxy group, a nitrile group or a halogen atom, such as fluorine, chlorine, bromine, or iodide, and wherein each of $R^3$, $R^4$, $R^5$, $R^6$ independently are selected from group consisting of hydrogen and $C_{1-6}$ alkyl groups.

Examples of suitable compounds for use in the composition according to the invention are: 2,3-dimethyl-2,3-diphenylbutane, 2,3-dipropyl-2,3-diphenylbutane, 2,3-dibutyl-2,3-diphenylbutane, 2,3-dihexyl-2,3-diphenylbutane, 2-methyl-3-ethyl-2,3-diphenylbutane, 2-methyl-2,3-diphenylbutane, 2,3-diphenylbutane, 2,3-dimethyl-2,3-di-(p-methoxyphenyl)-butane, 2,3-dimethyl-2,3-di-(p-methylphenyl)-butane, 2,3-dimethyl-2-methylphenyl-3-(p-2'3'-dimethyl-3'-methylphenyl-butyl)-phenyl-butane, 3,4-dimethyl-3,4-diphenylhexane, 3,4-diethyl-3,4-diphenylhexane, 3,4-dipropyl-3,4-diphenylhexane, 4,5-dipropyl-4,5-diphenyloctane, 2,3-diisobutyl-2,3-diphenylbutane, 3,4-diisobutyl-3,4-diphenylhexane, 2,3-dimethyl-2,3-di p(t-butyl)-phenyl-butane, 5,6-dimethyl-5,6-diphenyldecane, 6,7-dimethyl-6,7-diphenyldodecane, 7,8-dimethyl-7,8-di(methoxyphenyl)-tetra-decane, 2,3-diethyl-2,3-diphenylbutane, 2,3-dimethyl-2,3-di(p-chlorophenyl) butane, 2,3-dimethyl-2,3-di(p-iodophenyl) butane, and 2,3-dimethyl-2,3-di(p-nitrophenyl)butane, and the like.

A specific example of a suitable cross-linking agent for use in said composition is a substance according to Formula I wherein each of $R^3$, $R^4$, $R^5$ and $R^6$ is a methyl group, and each of $R^x$ and $R^y$ is a phenyl group. This substance is 2,3-dimethyl-2,3-diphenylbutane (CAS No 1889-67-4).

Another specific example of a suitable cross-linking agent for use in said composition is a substance according to Formula I wherein each of $R^3$ and $R^5$ is a methyl group, each of $R^4$ and $R^6$ is an ethyl group, and $R^x$ and $R^y$ is a phenyl group. This substance is 3,4-dimethyl-3,4-diphenylhexane (CAS No 10192-93-5).

Said unsaturated polyolefin is advantageously a thermoplastic unsaturated polyolefin, more advantageously a thermoplastic non-elastomeric unsaturated polyolefin.

In particular, said unsaturated polyolefin is an ethylene (co)polymer or a propylene (co)polymer, more particularly an ethylene (co)polymer more preferred a low density ethylene (co)polymer.

The unsaturated polyolefin for use in the composition according to the invention has a total amount of carbon-carbon double bonds/1000 carbon atoms of at least 0.38. In particular, the total amount of carbon-carbon double bonds in said unsaturated copolymer at least 0.40, at least 0.45, at least 0.50, at least 0.55, at least 0.60, at least 0.65, at least 0.70, at least 0.75, at least 0.80, at least 0.90 or at least 1.0/1000 carbon atoms.

In the context of the present invention, the term "total amount of carbon-carbon double bonds" refers to those double bonds originating from vinyl groups, vinylidene groups and trans-vinylene groups. The amount of each type of double bond is measured as indicated in the experimental part.

The total amount of vinyl groups in said unsaturated copolymer is advantageously at least 0.12, at least 0.15, at least 0.20, at least 0.25, at least 0.30, at least 0.35, at least 0.40, at least 0.45, at least 0.50, at least 0.55, at least 0.60, at least 0.65, at least 0.70, at least 0.75, or at least 0.80 vinyl groups/1000 C-atoms.

Of course, since a vinyl group is a specific type of carbon-carbon double bond, the total amount of vinyl groups for a given unsaturated polyolefin does not exceed its total amount of double bonds.

In particular, the unsaturated polyolefin can be prepared by copolymerizing an olefin monomer, such as ethylene or propylene, and at least one polyunsaturated comonomer.

The unsaturated olefin copolymer, such as ethylene copolymer, is advantageously produced by radical-initiated polymerisation at a pressure of about 100-400 MPa and at a temperature of about 80-350° C.

It shall be noted that the above mentioned temperature range include the initiating temperature as well as the peak temperature.

As used herein the term "copolymer" includes polymers produced by copolymerizing two or more monomers, e.g. three or four monomers as well.

Thus, two types of vinyl groups can be differentiated in said unsaturated olefin copolymer. One type of vinyl group is generated by the polymerisation process (e.g. via a β-scission reaction of a secondary radical) or results from the use of chain transfer agents, such as propylene, introducing vinyl groups (these vinyl groups are also referred to as terminal vinyl groups). Another type of vinyl group may originate from the polyunsaturated comonomer used for the preparation of the unsaturated polyolefin, as will be described later in greater detail.

The amount of vinyl groups originating from the polyunsaturated comonomer (also referred to as pendant vinyl groups) in said unsaturated olefin copolymer is advantageously at least 0.03/1000 carbon atoms, in particular at least 0.06, such as at least 0.09, at least 0.12, at least 0.15, at least 0.18, at least 0.21, at least 0.25, at least 0.30, at least 0.35 or at least 0.40/1000 carbon atoms.

It has been found suitable that said polyunsaturated comonomer used for producing said unsaturated olefin copolymer is selected from the group consisting of (i) a polyunsaturated compound having a straight carbon chain which is free from heteroatoms and has at least 8 carbon atoms and at least 4 carbon atoms between two non-conjugated double bonds, of which at least one is terminal, (ii) an α,ω-divinylsiloxane according to Formula III

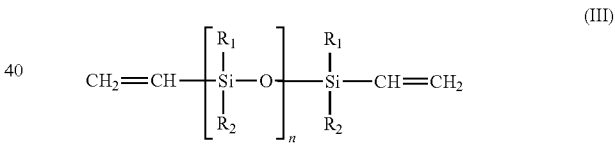

wherein $R_1$ and $R_2$, which can be alike or different, are selected among alkyl groups having 1-4 carbon atoms and alkoxy groups having 1-4 carbon atoms, and n is 1-200, (iii) an α,ω-divinylether of Formula IV

wherein R is $-(CH_2)_m-O-$, $-(CH_2CH_2O)_n-$, or $-CH_2-C_6H_{10}-CH_2-O-$, m is 2-10 and n is 1-5, and (iv) any combinations thereof.

The polyunsaturated compound used for producing said unsaturated olefin copolymer (olefin-non-conjugated diene copolymer) is advantageously a polyunsaturated compound selected from groups i) and/or ii) referred to above, more specifically a polyunsaturated compound selected from group i).

In a first group of embodiments of the composition according to the invention, the polyunsaturated comonomer used for producing said unsaturated olefin copolymer is a compound having a straight carbon chain which is free from heteroatoms and has at least 8 carbon atoms, in particular 8-16 carbon atoms, more particularly 8-12 carbon atoms, and at least 4 carbon atoms between two non-conjugated double bonds, of which at least one is terminal, such as an α,ω-alkadiene.

Said polyunsaturated comonomer, according to this first group of embodiments, should have a straight chain, since each tertiary or allylic hydrogen atom increases the risk of chain transfer.

Furthermore, said polyunsaturated comonomer, according to this first group of embodiments, is not substituted, i.e. it consists of an unsubstituted straight-chain hydrocarbon having at least two non-conjugated double bonds.

Examples of suitable alkadienes for use in the manufacturing of said unsaturated olefin copolymer, such as unsaturated ethylene copolymer, are 1,7-octadiene, 1,9-decadiene, 1,11-dodecadiene, 1,13-tetradecadiene, or mixtures thereof. Furthermore, dienes like 7-methyl-1,6-octadiene, 9-methyl-1,8-decadiene, or mixtures thereof can be mentioned.

For this first group of embodiments of the invention, it has been found desirable that the olefin copolymer, such as an ethylene copolymer, comprises 0.03-5% by weight, in particular 0.05-4% by weight, more particularly 0.1-1.5% by weight, of moieties derived from said polyunsaturated compound.

It shall be noted that a combination of two or more polyunsaturated comonomers, according to this first group of embodiments, can be used for producing said olefin copolymer for use in the composition according to the invention.

In a second group of embodiments of the composition according to the invention, the polyunsaturated comonomer used for producing said unsaturated olefin copolymer is an α,ω-divinylsiloxane according to Formula III

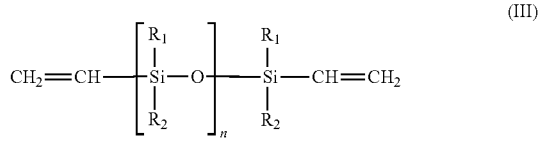

wherein $R_1$ and $R_2$, which can be alike or different, are selected among alkyl groups having 1-4 carbon atoms and alkoxy groups having 1-4 carbon atoms, and n is 1-200, For an optimum result, the distance between the double bonds of the polyunsaturated comonomer of Formula III should not be too great. This is expressed by the value of n in Formula III. Generally, n is 1-200 and in particular n is 1-100. More specifically, n is 1-50 owing to the higher addition of double bonds in proportion to the weight content of siloxane comonomer included in the copolymer.

It has been found advantageous that $R_1$ and $R_2$ are alike. Most advantageously, $R_1$ and $R_2$ are methyl, methoxy or ethoxy.

Examples of suitable α,ω-siloxanes are tetramethyl divinyldisiloxane and divinyl poly(dimethylsiloxanes).

For this second group of embodiments of the invention, it has been found desirable that the olefin copolymer, such as an ethylene copolymer, comprises 0.03-10% by weight, in particular 0.05-8% by weight, more particularly 0.1-5% by weight, of moieties derived from said α,ω-siloxanes.

It shall be noted that a combination of two or more α,ω-siloxanes can be used for producing said olefin copolymer for use in the composition according to the invention.

In a third group of embodiments of the composition according to the invention, the polyunsaturated comonomer used for producing said unsaturated olefin copolymer is a α,ω-divinylether of Formula IV $$H_2C=CH-O-R-CH=CH_2 \quad (IV)$$

wherein R is $-(CH_2)_m-O-$, $-(CH_2CH_2O)_n-$, or $-CH_2-C_6H_{10}-CH_2-O-$, m is 2-10 and n is 1-5.

As indicated in the foregoing, R in Formula IV may, inter alia, stand for $-(CH_2)_m-O-$, wherein m is 2-10. When m is 2, Formula IV signifies ethylene glycol divinyl ether, and when m is 4, 6, 8 and 10, formula (IV) signifies 1,4-butanediol divinyl ether, 1,6-hexanediol divinyl ether, 1,8-octanediol divinyl ether and 1,10-decanediol divinyl ether, respectively. 1,4-butanediol divinyl is most preferred.

Further, R in Formula IV may also stand for $-(CH_2CH_2O)_n-$, wherein n is 1-5. When n is 1, formula (IV) signifies ethylene glycol divinyl ether as above, and when n is 2, 3, 4 and 5, Formula IV signifies diethylene glycol divinyl ether, triethylene glycol divinyl ether, tetra ethylene glycol divinyl ether and pentaethylene glycol divinyl ether, respectively.

When R in Formula IV stands for $-CH_2-C_6H_{10}-CH_2-O-$, Formula IV signifies cyclohexane dimethanol divinyl ether.

Among the above examples of possible significations of Formula IV, 1,4-butanediol divinyl ether is currently the most suitable compound to use.

For this third group of embodiments of the invention, it has been found desirable that the olefin copolymer, such as an ethylene copolymer, comprises 0.03-5% by weight, in particular 0.05-2% by weight, more particularly 0.1-1.5% by weight, of moieties derived from said α,ω-divinylether.

It shall be noted that a combination of two or more α,ω-divinylethers can be used for producing said olefin copolymer for use in the composition according to the invention.

It shall also be noted that a combination of two or more polyunsaturated comonomers selected from the above described groups of alkadienes, α,ω-divinylsiloxanes and α,ω-divinylethers can be used for producing said olefin copolymer for use in the composition according to the invention.

Moreover, the copolymerisation of said unsaturated olefin copolymer may be implemented in the presence of one or more other comonomers. In addition to olefin, such as ethylene, and said at least one polyunsaturated comonomer, the olefin polymer for use in the composition according to the invention may contain up to, for instance, 40% by weight of at least one additional comonomer which is copolymerizable with said olefin and the polyunsaturated comonomer. Such comonomers are well-known to the expert and need not be accounted for in greater detail here.

Mention may, however, be made of olefinically, advantageously vinylically, unsaturated comonomers, such as $C_3$-$C_{20}$ α-olefins, e.g. propylene, 1-butene, 1-hexene and 1-nonene.

Propylene and higher α-olefins may be regarded as a special case, since they also act as chain-transfer agents and create terminal unsaturation in the polymer (Encyclopedia of Polymer Sciences and Technology, Rev. Ed., Vol. 6 (1986), pp 394-395). Using propylene (or some other higher α-olefin) as comonomer in addition to the polyunsaturated comonomer defined above thus makes it possible to further increase the degree of unsaturation of the produced copolymer in a comparatively simple and inexpensive manner.

It is also possible to use polar olefinically, advantageously vinylically, unsaturated monomers containing at least one functional group, optionally in combination with the $C_3$-$C_{20}$ comonomer(s), such as compounds containing hydroxyl groups, alkoxy groups, carbonyl groups, carboxyl groups and ester groups.

Examples of such comonomers are alkyl acrylates, such as $C_{1-6}$-alkyl acrylates; alkyl methacrylates, such as $C_{1-6}$-alkyl methacrylates; and vinyl acetates. Specific examples of suitable polar monomers are methyl, ethyl, propyl and butyl (meth)acrylates.

Thus, olefinically, advantageously vinylically, additional comonomers include (a) vinyl carboxylate esters, such as vinyl acetate and vinyl pivalate, (b) α-olefins, such as propene, 1-butene, 1-hexene, 1-octene and 4-methyl-1-pentene, (c) (meth)acrylates, such as methyl(meth)acrylate, ethyl (meth)acrylate and butyl(meth)acrylate, (d) vinylically unsaturated carboxylic acids, such as (meth)acrylic acid, maleic acid and fumaric acid, (e) (meth)acrylic acid derivatives, such as (meth)acrylonitrile and (meth)acrylic amide, (f) vinyl ethers, such as vinyl methyl ether and vinyl phenyl ether, (g) aromatic vinyl compounds, such as styrene and alpha-methyl styrene, and vinylically unsaturated, hydrolysable silane monomers. Two or more such olefinically unsaturated compounds may be used in combination.

The amount of crosslinking agent in said composition according to the invention is advantageously 0.1-5.0% by weight, in particular 0.2-4.0% by weight, more particularly 0.4-3.0% by weight, based on the weight of the crosslinkable polymer composition.

It is preferred that in the crosslinkable polymer composition according to the invention the unsaturated polyolefin (i) is present in an amount of 80 wt.-% or more, more preferred of 90 wt.-% or more, and most preferred of 95 wt.-% or more.

As is usually the case for polymer compositions, the crosslinkable polymer composition may also contain various other additives, such as thermoplastics, antioxidants, stabilisers, processing aids, lubricants, retardant additives, acid scavengers, fillers, colouring agents, foaming agents, crosslinking boosters, scorch retardants and water tree retardant additives.

Examples of crosslinking boosters are compounds having a vinyl and/or an allyl group, e.g. triallylcyanurate, triallylisocyanurate, diacrylates, tricrylates and tetraacrylates.

As to the thermoplastics added, mention may be made of polyolefins, such as polyethylene of low density, medium density and high density, polypropylene, chlorinated polyethylene, as well as various copolymers including ethylene and one or more other comonomers, e.g. vinyl acetate, methyl acrylate, acrylate, propene, butene, hexene and the like. One may use either a single polyolefin or a mixture of several polyolefins.

As to fillers, mention may be made of inorganic fillers, such as silicates, e.g. kaolin, talc, montmorillonite, zeolite, mica, silica, calcium silicate, powdered glass, glass fibre, calcium carbonate, gypsum, magnesium carbonate; magnesium hydroxide, aluminum hydroxide, carbon black and titanium oxide. The content of the inorganic filler may be up to 60% by weight, as based on the sum of the weights of the filler and the ethylene copolymer of the invention.

It appears from the foregoing that the crosslinkable polymer composition according to the invention can be used for preparing a crosslinked polymer composition by treatment of the polymer composition under crosslinking conditions.

Consequently, the invention also relates to the use of a crosslinking agent being a carbon-carbon initiator that is free of peroxide groups and capable of thermally decomposing into carbon-based free radicals by breaking at least one carbon-carbon single bond, in particular a substance according to Formula I, more particularly a substance according to Formula II, for crosslinking of an unsaturated polyolefin having a total amount of carbon-carbon double bonds/1000 carbon atoms of at least 0.38.

It is also evident from the above disclosure that the crosslinkable polymer composition can be used for preparing a multilayered article, such as a power cable (including single- and multi-wire cables), having at least one layer comprising said composition. Thus, the crosslinkable composition can be applied as one or more layers onto a substrate, such as a metallic conductor and/or at least one coating layer thereof, by extrusion and thereafter treated under crosslinking conditions thereby forming, for instance, a semiconducting layer, an insulating layer and/or a jacketing layer of a power cable.

In the context of the present invention, a power cable is defined to be a cable transferring energy operating at any voltage. The voltage applied to the power cable can be alternating (AC), direct (DC), or transient (impulse). In a particular embodiment, the multilayered article is a power cable operating at voltages higher than 1 kV. In other embodiments, the power cable prepared using the composition according to the invention is operating at voltages higher than 6 kV.

In such an extrusion process as referred to above, the sequence of mixing the components of the crosslinkable composition can be varied, as explained below.

According to one embodiment, the unsaturated polyolefin is mixed with optional additives, either on solid pellets or powder or by melt mixing, followed by forming pellets from the melt. Subsequently, the crosslinking agent is added to the pellets or powder in a second step. The final pellets are fed to the extruder, e.g. a cable extruder.

According to a second embodiment, instead of a two-step process, the unsaturated polyolefin, for instance in the form of pellets or powder, the crosslinking agent, and optional additives are added to a compounding extruder, single or twin screw.

According to another embodiment, a mix of all components, i.e. crosslinking agent and optional additives, are added onto the pellets or powder made of the unsaturated polyolefin.

According to still another embodiment, pellets made of the unsaturated polyolefin, containing optional additives, are prepared in a first step, e.g. by melt mixing. These pellets are then fed into the cable extruder. Subsequently, the crosslinking agent is either fed in the hopper or directly into the cable extruder. Alternatively, crosslinking agent and/or scorch retarder and/or crosslinking booster are already added to the pellets before feeding these pellets into the extruder.

According to another preferred embodiment, pellets made of the unsaturated polyolefin without any additional components are fed to the extruder. Subsequently, crosslinking agent and optionally a scorch retarder, optionally in combination with an antioxidant(s) and/or further additives such as crosslinking boosters, are fed in the hopper or directly fed into the polymeric melt within the cable extruder. Alternately, at least one of these components, i.e. crosslinking agent, scorch retarder, crosslinking booster, antioxidant, or a mixture of these components is already added to the pellets before feeding these pellets into the cable extruder.

According to still another embodiment, a highly concentrated master batch containing said crosslinking agent is prepared. The master batch may also comprise optional other additives. This master batch is then added to/mixed with the unsaturated polyolefin.

Other applications for the crosslinkable polymer composition according to the invention may, however, also be contemplated such as in the production of pipes, particularly water pipes and gas pipes, and products made by injection or rotational moulding.

The invention will now be illustrated by means of the following non-limiting examples.

Methods
Determination of the Amount of Double Bonds and Vinyl Groups in Ethylene-Diene Polymers Comprising $CH_2=CH-CH_2$ The procedure for the determination of the amount of double bonds/1000 C-atoms is based upon the ASTM D3124-72 method. In that method, a detailed description for the determination of vinylidene groups/1000 C-atoms is given based on 2,3-dimethyl-1,3-butadiene. This sample preparation procedure has also been applied for the determination of vinyl groups/1000 C-atoms, vinylidene groups/1000 C-atoms and trans-vinylene groups/1000 C-atoms in the present invention. However, for the determination of the extinction coefficient for these three types of double bonds, the following three compounds have been used: 1-decene for vinyl, 2-methyl-1-heptene for vinylidene and trans-4-decene for trans-vinylene, and the procedure as described in ASTM-D3124 section 9 was followed.

The total amount of double bonds was analyzed by means of IR spectrometry and given as the amount of vinyl bonds, vinylidene bonds and trans-vinylene bonds, respectively.

Thin films were pressed with a thickness of 0.5-1.0 mm. The actual thickness was measured. FT-IR analysis was performed on a Perkin Elmer 2000. Four scans were recorded with a resolution of 4 cm$^{-1}$.

A base line was drawn from 980 cm$^{-1}$ to around 840 cm$^{-1}$. The peak heights were determined at around 888 cm$^{-1}$ for vinylidene, around 910 cm$^{-1}$ for vinyl and around 965 cm$^{-1}$ for trans-vinylene. The amount of double bonds/1000 carbon atoms was calculated using the following formulas (ASTM D3124-72):

$$\text{vinylidene/1000 C-atoms} = (14 \times A)/(18.24 \times L \times D)$$

$$\text{vinyl/1000 C-atoms} = (14 \times A)/(13.13 \times L \times D)$$

$$\text{trans-vinylene/1000 C-atoms} = (14 \times A)/(15.14 \times L \times D)$$

wherein
A: absorbance (peak height)
L: film thickness in mm
D: density of the material The total amount of vinyl groups of each polymer was determined by FT-IR measurements, as described above. Then, it is assumed that the base level of vinyl groups, i.e. the ones formed by the process without the addition of chain transfer agent resulting in vinyl groups and without the presence of a polyunsaturated comonomer, is the same for a reference homopolymer and for the unsaturated polymer (these polymers have been produced on the same reactor, basically using the same conditions, i.e. similar temperature, pressure and production rate). This base level is then subtracted from the measured amount of vinyl groups in the unsaturated polymer, thereby resulting in the amount of vinyl groups/1000 C-atoms, which result from the polyunsaturated comonomer.

In the case of ethylene-divinyleter copolymers, a peak at around 810 cm$^{-1}$ is used instead for determination of the amount of the number of pendant vinyl groups. For the determination of the total number of vinyl groups both the contribution from around 910 cm$^{-1}$ and 810 cm$^{-1}$ are used. For the quantification of the 810 cm$^{-1}$ the same extinction coefficients as given above was used.

In the case of ethylene-divinylsiloxane copolymers, a peak at around 954 cm$^{-1}$ is used instead for determination of the amount of pendant vinyl groups. For the quantification the same extinction above was used. A baseline was drawn from 963 cm$^{-1}$ to 943 cm$^{-1}$ for the determination of the peak height at around 954 cm$^{-1}$. For the determination of the total number of vinyl groups both the contribution from around 910 cm$^{-1}$ and 954 cm$^{-1}$ are used. For the quantification of the 954 cm$^{-1}$ the same extinction coefficient as for the vinyl groups given above was used.

Preparation of Crosslinked Films

Polymer granules were cooled in liquid nitrogen and ground in a Retsch rotary cutter. The crosslinking agent was dissolved in pentane. The samples, in powder form, were impregnated with the solution and then dried under vacuum.

Thin films, 0.1-0.15 mm, were crosslinked in a hot press. Initially, the samples were melted between two Teflon sheets in a low temperature press, 125° C., 30 seconds, without pressure followed by 2 min with a pressure of 30 bar. They were then transferred directly to another press and allowed to crosslink for different periods of time, i.e. 7.5 to 37 minutes in the Examples described below, at a temperature within the range of 200-240° C. with a pressure of 30 bar. After completed crosslinking the thin film was allowed to cool to room temperature.

Determination of Degree of Crosslinking

Gel content was determined by a solvent extraction technique based on ASTM D 2765-95. A known amount of a crosslinked polyethylene sample was placed in a pre-weighed 100 mesh stainless steel basket. Twelve baskets were extracted in 1.1 l decaline, decahydronaphthalene, together with a stabilizer (10 g Irganox 1076) for 6 h. The solvent was renewed (0.9 l) and the extraction continued for a further hour. The samples were finally dried under vacuum at 80° C. for 5 h. The non-soluble fraction was weighed and the gel content calculated.

Determination of Concentration of Crosslinking by-Products

The crosslinking by-product concentration can be determined according to HD632 A1:1998, Part 2. A detailed description can be found under 2.4.15.

Example 1

The degree of crosslinking was determined in accordance with the above described gel content method for three polymer compositions comprising 2-3% by weight of 3,4-dimethyl-3,4-diphenylhexane as crosslinking agent and one of the following low density polyethylenes (LDPE):

(1) an ethylene homopolymer having a density of 923 kg/m$^3$, measured according to ISO 1183:1987-D, a melt flow rate (MFR$_2$) of 2.0 g/10 min, measured according to ISO 1133, and a total amount of vinyl groups/1000 carbon atoms of 0.12, measured according to the method described above, (2) a poly(ethylene-co-1,9-decadiene) having a density of 923 kg/m$^3$, measured according to ISO 1183:1987-D, a melt flow rate (MFR$_2$) of 2.0 g/10 min, measured according to ISO 1133, and a total amount of vinyl groups/1000 carbon atoms of 0.68, measured according to the method described above, or (3) a poly(ethylene-co-tetramethyl divinyldisiloxane) a melt flow rate (MFR$_2$) of 21 g/10 min, measured according to ISO 1133, and a total amount of vinyl groups/1000 carbon atoms of 1.2.

Thin films of these three crosslinkable compositions were prepared as described above.

These films were crosslinked for varying time periods and at varying temperatures (see Table 1) in accordance with the method described above.

The films were determined to have the following gel contents using the above described method.

TABLE 1

| Polymer | Content of crosslinking agent [% by weight] | Crosslinking time [min] | Crosslinking temp. [° C.] | Gel content [%] |
|---|---|---|---|---|
| 1 | 3 | 37 | 240 | 3 |
| 1 | 3 | 15 | 250 | 1 |
| 2 | 2 | 37 | 240 | 11.7 |
| 3 | 3 | 37 | 240 | 57.8 |
| 3 | 3 | 15 | 250 | 54.1 |
| 3 | 2 | 7.5 | 240 | 41.5 |
| 3 | 2 | 30 | 220 | 53.3 |
| 3 | 2 | 30 | 200 | 46.3 |

As seen from Table 1, 3,4-dimethyl-3,4-diphenyl hexane are suitable for crosslinking of unsaturated ethylene copolymers, such as polymers 2 and 3.

However, Table 1 also shows that an insufficient crosslinking is obtained when using 3,4-dimethyl-3,4-diphenyl hexane for crosslinking of conventional polyethylene having a low degree of unsaturation (reference is here made to U.S. Pat. No. 4,027,080).

Example 2

Example 1 was repeated except that a 0.5% by weight of a crosslinking booster, triallylcyanurate, was added to the polymer compositions.

The films were determined to have the following gel contents using the above described method.

TABLE 2

| Polymer | Content of crosslinking agent [% by weight] | Content of crosslinking booster [% by weight] | Crosslinking time [min] | Crosslinking temp. [° C.] | Gel content [%] |
|---|---|---|---|---|---|
| 1 | 2 | 0.5 | 30 | 200 | 8.7 |
| 2 | 2 | 0.5 | 30 | 200 | 28.1 |
| 3 | 2 | 0.5 | 30 | 200 | 50.5 |

As seen from Table 2, the addition of 0.5% of said crosslinking booster increases the gel content of the crosslinked composition. However, a rather low crosslinking degree is still obtained when using 3,4-dimethyl-3,4-diphenyl hexane and triallylcyanurate for crosslinking of conventional polyethylene having a low degree of unsaturation (reference is here made to JP-06-275129).

While the invention has been described in detail and with reference to specific embodiments thereof, it will be apparent for one skilled in the art that various changes and modifications can be made therein without departing from the spirit and scope thereof.

The invention claimed is:

1. A crosslinkable polymer composition comprising
   (i) an unsaturated polyolefin having a total amount of carbon-carbon double bonds/1000 carbon atoms of at least 0.38, and
   (ii) at least one crosslinking agent being a carbon-carbon initiator that is free of peroxide groups and capable of thermally decomposing into carbon-based free radicals by breaking at least one carbon-carbon single bond.

2. The polymer composition according to claim 1, wherein said crosslinking agent is a compound according to Formula I

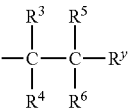

(I)

wherein each of $R^3$, $R^4$, $R^5$ and $R^6$ independently is selected from the group consisting of hydrogen, substituted and unsubstituted straight, branched, and cyclic, including aromatic, hydrocarbons, and each of $R^x$ and $R^y$ independently is selected from the group consisting of substituted and unsubstituted aromatic hydrocarbons.

3. The polymer composition according to claim 2, wherein each of $R^x$ and $R^y$ independently is selected from the group consisting of aryl groups.

4. The polymer composition according to claim 3, wherein each of $R^x$ and $R^y$ is a phenyl group.

5. The polymer composition according to claim 2, wherein each of $R^3$, $R^4$, $R^5$ and $R^6$ independently is selected from the group consisting of alkyl groups.

6. The polymer composition according to claim 5, wherein each of $R^3$, $R^4$, $R^5$ and $R^6$ independently is selected from the group consisting of $C_{1-6}$ alkyl groups.

7. The polymer composition according to claim 2, wherein said crosslinking agent is a compound according to Formula II:

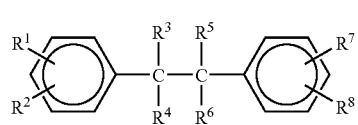

(II)

wherein each of $R^1$, $R^2$, $R^7$, $R^8$ independently is selected from group consisting of a hydrogen atom, an $C_{1-6}$ alkyl group, an $C_{1-2}$ alkoxy group, a nitrile group or a halogen atom, and wherein each of $R^3$, $R^4$, $R^5$, $R^6$ independently is selected from group consisting of hydrogen and $C_{1-6}$ alkyl groups.

8. The polymer composition according to claim 7, wherein said compound is selected from the group consisting of 2,3-dimethyl-2,3-diphenylbutane, 2,3-dipropyl-2,3-diphenylbutane, 2,3-dibutyl-2,3-diphenylbutane, 2,3-dihexyl-2,3-diphenylbutane, 2-methyl-3-ethyl-2,3-diphenylbutane, 2-methyl-2,3-diphenylbutane, 2,3-diphenylbutane, 2,3-dimethyl-2,3-di-(p-methoxyphenyl)-butane, 2,3-dimethyl-2,3-di-(p-methylphenyl)-butane, 2,3-dimethyl-2-methylphenyl-3-(p-2'3'-dimethyl-3'-methylphenyl-butyl)-phenyl-butane, 3,4-dimethyl-3,4-diphenylhexane, 3,4-diethyl-3,4-diphenylhexane, 3,4-dipropyl-3,4-diphenylhexane, 4,5-dipropyl-4,5-diphenyloctane, 2,3-diisobutyl-2,3-diphenylbutane, 3,4-diisobutyl-3,4-diphenylhexane, 2,3-dimethyl-2,3-di p(t-butyl)-phenyl-butane, 5,6-dimethyl-5,6diphenyldecane, 6,7-dimethyl-6,7-diphenyldodecane, 7,8-dimethyl-7,8-di(methoxyphenyl)-tetra-decane, 2,3-diethyl-2,3-diphenylbutane, 2,3-dimethyl-2,3-di(p-chlorophenyl) butane, 2,3-dimethyl-2,3-di(p-iodophenyl) butane, and 2,3-dimethyl-2,3-di(p-nitrophenyl) butane.

9. The polymer composition according to claim 8, wherein said compound is selected from the group consisting of 2,3-dimethyl-2,3-diphenylbutane and 3,4-dimethyl-3,4-diphenylhexane.

10. The polymer composition according to claim 1, wherein the polyolefin has a total amount of carbon-carbon double bonds of at least 0.40.

11. The polymer composition according to claim 10, wherein the polyolefin has a total amount of carbon-carbon double bonds of at least 0.55.

12. The polymer composition according to claim 11, wherein the polyolefin has a total amount of carbon-carbon double bonds of at least 0.65.

13. The polymer composition according to claim 1, wherein the unsaturated polyolefin has a total amount of vinyl groups/1000 carbon atoms of at least 0.12.

14. The polymer composition according to claim 13, wherein the unsaturated polyolefin has a total amount of vinyl groups/1000 carbon atoms of at least 0.15.

15. The polymer composition according to claim 14, wherein the unsaturated polyolefin has a total amount of vinyl groups/1000 carbon atoms of at least 0.35.

16. The polymer composition according to claim 15, wherein the unsaturated polyolefin has a total amount of vinyl groups/1000 carbon atoms of at least 0.65.

17. The polymer composition according to claim 1, wherein the unsaturated polyolefin is a thermoplastic unsaturated polyolefin.

18. The polymer composition according to claim 17, wherein the unsaturated polyolefin is a thermoplastic non-elastomeric unsaturated polyolefin.

19. The polymer composition according to claim 17, wherein the unsaturated polyethylene is produced by radical-initiated polymerization at a pressure of about 100-400 MPa and at a temperature of about 80-350° C.

20. The polymer composition according to claim 1, wherein the unsaturated polyolefin is prepared by copolymerizing an olefin monomer and at least one polyunsaturated comonomer.

21. The polymer composition according to claim 20, wherein the olefin monomer is ethylene.

22. The polymer composition according to claim 20, wherein the unsaturated polyolefin has an amount of vinyl groups/1000 carbon atoms which originate from the polyunsaturated comonomer of at least 0.03, based upon ASTM D3124-72, wherein the base line is drawn from 980 cm$^{-1}$ to around 840 cm$^{-1}$ and the peak heights are determined at around 910 cm$^{-1}$ for vinyl for the unsaturated polyolefin and a reference homopolyolefin and the base level of the reference polyolefin is subtracted from the amount of vinyl groups/1000 carbon atoms of the unsaturated polyolefin.

23. The polymer composition according to claim 20, wherein the polyunsaturated comonomer is selected from the group consisting of
(i) a polyunsaturated compound having a straight carbon chain which is free from heteroatoms and has at least 8 carbon atoms and at least 4 carbon atoms between two non-conjugated double bonds, of which at least one is terminal,
(ii) an α,ω-divinylsiloxane according to Formula III

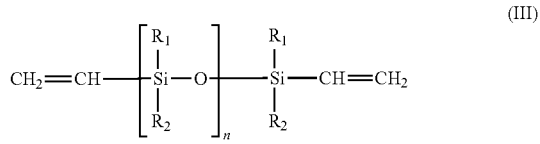

(III)

wherein $R_1$ and $R_2$, which can be alike or different, are selected among alkyl groups having 1-4 carbon atoms and alkoxy groups having 1-4 carbon atoms, and n is 1-200,
(iii) an α,ω-divinylether of Formula IV

$H_2C=CH-O-R-CH=CH_2$ (IV)

wherein R is $-(CH_2)_m-O-$, $-(CH_2CH_2O)_n-$, or $-CH_2-C_6H_{10}-CH_2-0-$, m is 2-10 and n is 1-5, and
(iv) any combinations thereof.

24. The polymer composition according claim 23, wherein the polyunsaturated compound is an α,ω-diene selected from the group consisting of tetramethyl divinyl-disiloxane, divinyl poly(dimethylsiloxane), 1,7-octadiene, 1,9-decadiene, 1,11-dodecadiene, 1,13-tetradecadiene, 7-methyl-1,6-octadiene, 9-methyl-1,8-decadiene, 1,4-butanediol divinyl ether, 1,6-hexanediol divinyl ether, 1,8-octanediol divinyl ether, 1,10-decanediol divinyl ether, diethylene glycol divinyl ether, triethylene glycol divinyl ether, tetra ethylene glycol divinyl ether, pentaethylene glycol divinyl ether, cyclohexane dimethanol divinyl ether, and any combinations thereof.

25. The polymer composition according to claim 20, wherein the unsaturated polyolefin is prepared by copolymerizing an olefin monomer, at least one polyunsaturated comonomer and at least one additional olefinically unsaturated monomer.

26. The polymer composition according to claim 25, wherein said at least one additional olefinically unsaturated monomer is selected from the group consisting of vinyl carboxylate esters, α-olefins, (meth)acrylates, vinylically unsaturated carboxylic acids, (meth)acrylic acid derivatives, vinyl ethers, aromatic vinyl compounds, and any combinations thereof.

27. The polymer composition according to claim 1, further comprising at least one crosslinking booster.

28. The polymer composition according to claim 27, wherein said at least one crosslinking booster is selected from the group consisting of triallylcyanurate, triallylisocyanurate, diacrylates, triacrylates, tetraacrylates and any combination thereof.

29. The process for the preparation of a crosslinked polymer composition, wherein the crosslinkable polymer composition according to claim 1 is provided, followed by treatment of the polymer composition under crosslinking conditions.

30. A multilayered article having at least one layer comprising the crosslinkable polymer composition according to claim 1.

31. The article according to claim 30, wherein the article is a power cable.

32. The article according to claim 31, wherein said at least one layer is selected from the group consisting of a semiconducting layer, an insulating layer, a jacketing layer, and any combination thereof.

33. A process for the production of a multilayered article, wherein the crosslinkable polymer composition according to claim 1 is applied as one or more layers onto a substrate by extrusion and thereafter treated under crosslinking conditions.

34. The process according to claim 33, wherein the multilayered article is a power cable and the crosslinkable polymer composition is applied onto a metallic conductor and/or at least one coating layer thereof.

35. A method for crosslinking a polymer composition comprising an unsaturated polyolefin having a total amount of carbon-carbon double bonds/1000 carbon atoms of at least 0.38 by using a crosslinking agent being a carbon-carbon initiator that is free of peroxide groups and capable of thermally decomposing into carbon-based free radicals by breaking at least one carbon-carbon single bond.

36. The polymer composition according to claim 20, wherein the unsaturated polyethylene is produced by radical-initiated polymerization at a pressure of about 100-400 MPa and at a temperature of about 80-350° C.

* * * * *